United States Patent
Matayoshi et al.

(10) Patent No.: US 8,225,953 B2
(45) Date of Patent: Jul. 24, 2012

(54) RESIN-MADE FUEL TANK STRUCTURE OF VEHICLE

(75) Inventors: Takahiro Matayoshi, Saitama (JP); Akihito Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 12/320,772

(22) Filed: Feb. 4, 2009

(65) Prior Publication Data

US 2009/0242551 A1  Oct. 1, 2009

(30) Foreign Application Priority Data

Mar. 27, 2008  (JP) ................. 2008-082457

(51) Int. Cl.
*B65D 3/00* (2006.01)
*B65D 6/10* (2006.01)
*B65D 8/02* (2006.01)

(52) U.S. Cl. ..................... 220/86.2; 220/4.14

(58) Field of Classification Search .............. 220/4.13, 220/4.14, 86.2, 562; 137/590
See application file for complete search history.

(56) References Cited

U.S. PATENT DOCUMENTS

| 4,759,459 A | * | 7/1988 | Bailey et al. ................. 220/86.2 |
| 6,332,555 B1 | * | 12/2001 | Stangier ....................... 220/562 |
| 7,731,238 B2 | * | 6/2010 | Otsubo et al. ................. 280/835 |
| 2007/0254172 A1 | | 11/2007 | Kanazawa et al. |

FOREIGN PATENT DOCUMENTS

JP  2002-160537  6/2002

* cited by examiner

*Primary Examiner* — Harry Grosso
(74) *Attorney, Agent, or Firm* — Squire Sanders (US) LLP

(57) ABSTRACT

A resin-made fuel tank structure of a vehicle is provided to suppress the formation of a notch in a mounting portion of an insert portion on a tank body. The fuel tank structure includes a tank body. The tank body includes a resin material having fuel permeation resistance. The fuel tank structure includes an insert portion separate from the tank body. The insert portion includes a resin material. The insert portion also includes a mounting portion to mount the insert portion on the tank body and a fuel fill opening. The insert portion is configured to be mounted to an outer layer of the tank body. The outer layer of the tank body is configured to be in close contact with an end portion of the mounting portion of the insert portion. The outer layer is configured to bulge more outward and upward than the mounting portion.

6 Claims, 7 Drawing Sheets

(A)

(B)

RESIN-MADE FUEL TANK STRUCTURE OF VEHICLE

FIELD

Some of the embodiments discussed herein relate to a fuel tank structure made of a fuel-permeation-resistant resin material of a vehicle.

BACKGROUND

Conventionally, a fuel tank, which is made of resin in place of a metal material such as iron or aluminum, has been developed and is put into a commercial use to reduce a weight of a vehicle such as a motorcycle.

With respect to this type of fuel tank, there has been known a fuel tank that includes a tank body which adopts the multi-layered structure consisting of an outer layer, an intermediate layer and an inner layer, and an insert portion which constitutes a takeout portion of fuel is mounted on the outer layer of the tank body by heat plate welding. Such a configuration is shown, for example, in Japanese Patent Publication JP-A 2002-160537.

In the conventional constitution, although the insert portion is arranged on the outer layer, when forming the outer layer, the insert portion is configured such that a force is hardly applied to the outer layer at an end portion of the insert portion. Accordingly, there exists a possibility that a notch may be formed in a mounting portion of the insert portion to be mounted on the tank body. This notch is an extremely small gap formed in a mounting portion arranged between the insert portion and the tank body due to shrinkage of the outer layer after the insert portion is mounted on the outer layer of the tank body by welding.

SUMMARY

According to one embodiment of the invention, a fuel tank structure may be provided for a vehicle. The fuel tank structure can include a tank body. The tank body can include a resin material that may have fuel permeation resistance. The fuel tank structure can include an insert portion separate from the tank body. The insert portion can include a resin material. The insert portion can also include a mounting portion to mount the insert portion on the tank body and a fuel fill opening. The insert portion may be configured to be mounted to an outer layer of the tank body. The outer layer of the tank body may be configured to be in close contact with an end portion of the mounting portion of the insert portion. The outer layer may be configured to bulge more outward and upward than the mounting portion.

According to another embodiment of the invention, a method of forming a fuel tank structure of a vehicle can include providing a tank body that may include a resin material. The resin material can have fuel permeation resistance. The method can include providing an insert portion separate from the tank body. The insert portion can include a resin material. The insert portion can also include a mounting portion and a fill fuel opening. The method can include mounting a mounting portion of the insert portion on the tank body. The method can include welding the insert portion to an outer layer of the tank body. The method can include configuring the outer layer of the tank body to be in close contact with an end portion of the mounting portion of the insert portion. The method can include configuring the outer layer to bulge more outward and upward than the mounting portion.

According to another embodiment of the invention, a fuel tank structure may be provided for a vehicle. The fuel tank structure can include a tank body means for providing a tank body. The tank body can include a resin material that may have fuel permeation resistance. The fuel tank structure can include an insert portion means for providing an insert portion separate from the tank body. The insert portion can include a resin material and can also include a mounting portion and an fill fuel opening. The fuel tank structure can include a mounting portion means for mounting a mounting portion of the insert portion on the tank body. The fuel tank structure can include an outer layer means for welding the insert portion to an outer layer of the tank body. The outer layer of the tank body can be configured to be in close contact with an end portion of the mounting portion of the insert portion. The outer layer can configured to bulge more outward and upward than the mounting portion.

DESCRIPTION OF THE PREFERRED EMBODIMENTS

Hereinafter, some of the embodiments of the are explained in conjunction with drawings.

Figure 1:
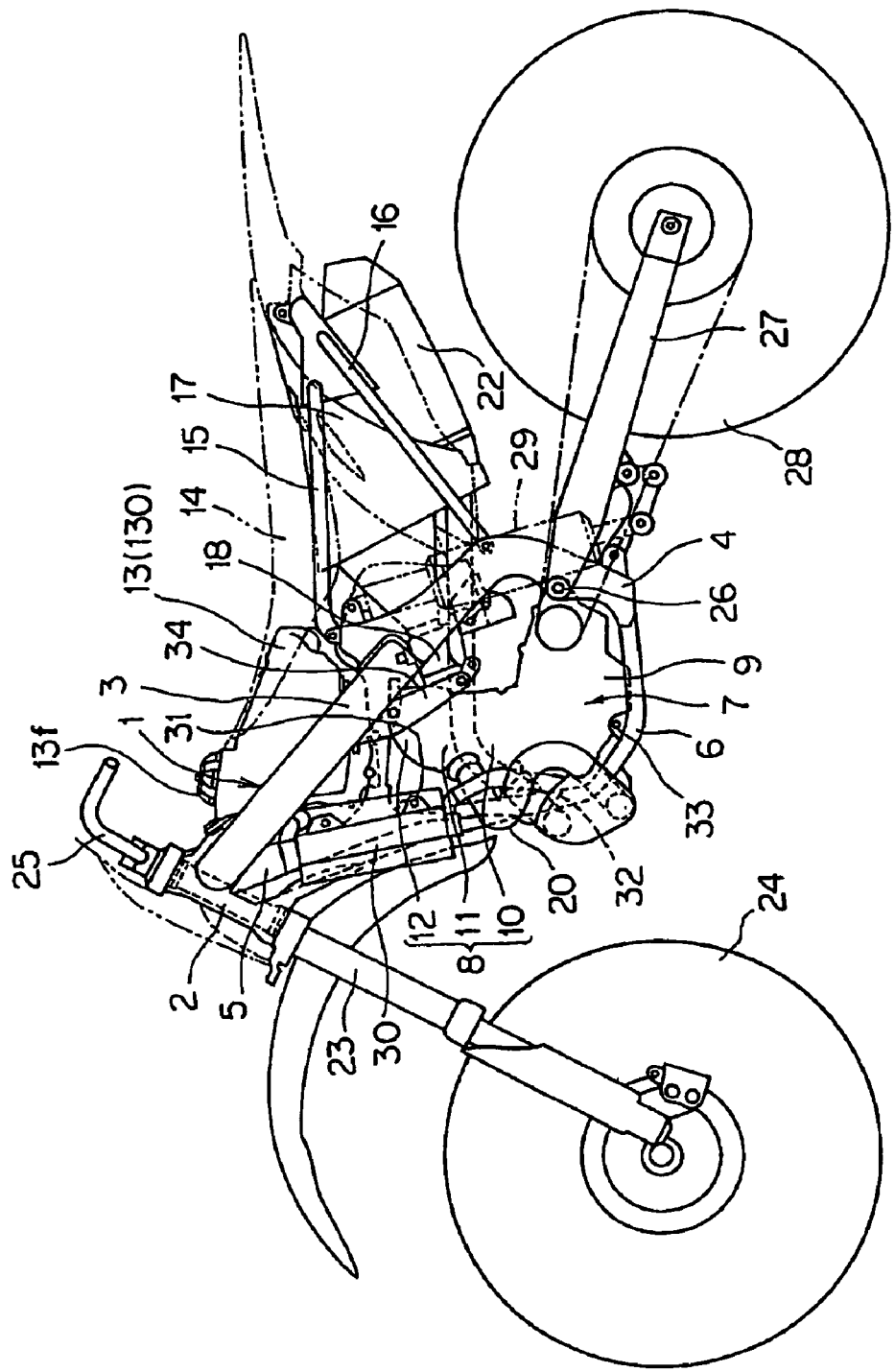
FIG. 1 is a side view of a motorcycle having a fuel tank structure according to an embodiment of the invention.

FIG. 1 illustrates a side view of a off-road-type motorcycle that may include a fuel tank structure according to one embodiment. A vehicle body frame 1 of the motorcycle includes a head pipe 2, a main frame 3, a center frame 4, a down frame 5, and a lower frame 6. These parts may be connected together in a loop shape, and an engine 7 may be supported inside the loop. The engine 7 may include a cylinder 8 and a crankcase 9. The main frame 3, the center frame 4 and the lower frame 6 may be respectively formed of a pair of left and right bodies, and the head pipe 2 and the down frame 5 may be respectively arranged along the center of the vehicle body using a single member. The main frame 3 may extend in a linearly oblique downward and rearward direction above the engine 7, and may be connected to an upper end portion of the center frame 4 which may extend in the vertical direction behind the engine 7. The down frame 5 may extend downwardly in the oblique downward direction in front of the engine 7, and may have a lower end portion thereof connected to a front end portion of the lower frame 6.

The lower frame 6 may be bent toward a position below the engine 7 from a portion thereof arranged below a front lower portion of the engine 7. The lower frame 6 may extend approximately linearly in the rearward direction. The lower frame may also have a rear end portion thereof connected to a lower end portion of the center frame 4. A fuel tank 13 may be arranged above the engine 7, and the fuel tank 13 may be supported on the main frame 3. A seat 14 may be arranged behind the fuel tank 13, and the seat 14 may be supported on a seat rail 15, which extends rearwardly from an upper end of the center frame 4. A reinforcing pipe 16 may be arranged below the seat rail 15. An air cleaner 17 may be supported on the seat rail 15 and the reinforcing pipe 16. The air cleaner 17 may intake air from a rear side of the vehicle body toward a cylinder head 11 by way of a throttle body 18.

From a front portion of the cylinder 8, an exhaust pipe 20 may extend downwardly by being bent in an approximately S shape. The exhaust pipe 20 may pass a front portion of the crankcase 9 and may extend rearward, and may traverse the center frame 4. A rear end portion of the exhaust pipe 20 may be supported on the reinforcing pipe 16 behind the center frame 4, and a muffler 22 may be connected to a rear end of the exhaust pipe 20. A front fork 23 may be supported on the head pipe 2. A front wheel 24, which is supported on a lower end portion of the front fork 23, may be steered by a handle 25. On a pivot shaft 26 of the center frame 4, a front end portion of a rear arm 27 may be mounted. The rear arm 27 may be supported on the center frame 4 in a rockable manner about the pivot shaft 26. A rear wheel 28 may be supported on a rear end portion of the rear arm 27. In addition, the rear wheel 28 may be driven by the engine 7 by way of a chain. A cushion unit 29 of a rear suspension may be arranged between the rear arm 27 and a rear end portion of the center frame 4. Numeral 30 indicates a radiator, numeral 31 indicates a rubber mount portion. Numeral 32, 33 indicate engine mount portions. Numeral 34 indicates an engine hanger. Finally, numeral 35 indicates an electronic component casing. Here, the engine 7 may be supported on the center frame 4 also using the pivot shaft 26.

Figure 2:
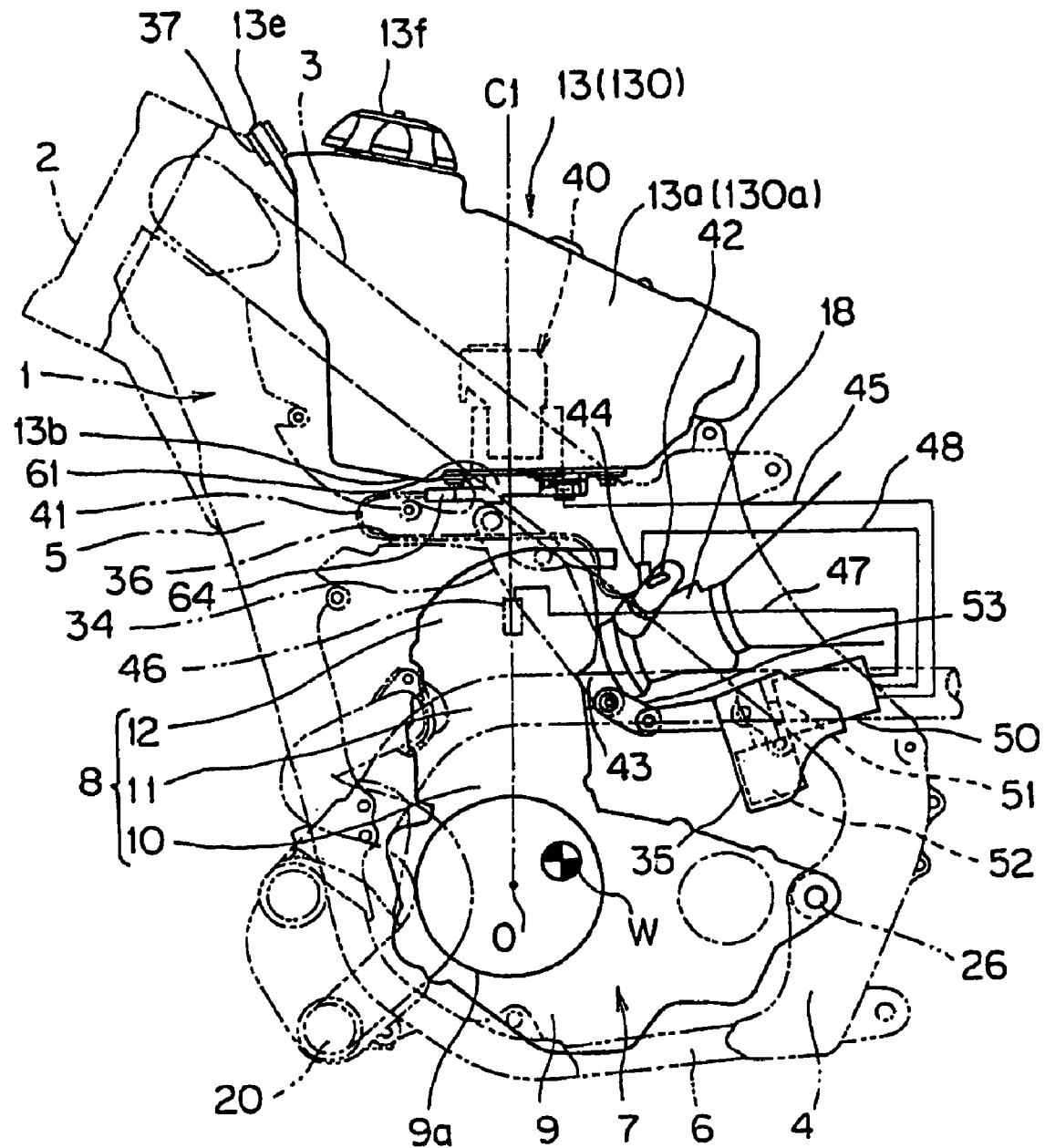
FIG. 2 is an enlarged side view of an engine and a portion of a fuel supply system.

FIG. 2 illustrates an enlarged side view showing the engine and a portion of a fuel supply system.

The engine 7 may be of a water-cooled 4-cycle type. The cylinder 8 of the engine 7 may be mounted on a front portion of the crankcase 9 in an erected manner in a state that a cylinder axis C1 thereof may be arranged approximately perpendicularly. The cylinder 8 may include a cylinder block 10, the cylinder head 11 and a head cover 12 in vertically ascending order. By arranging the cylinder 8 in an erected manner, a length of the engine 7 in the longitudinal direction can be shortened thus allowing the engine 7 to have the constitution suitable for an off-road vehicle. At a position directly above the cylinder 8, the fuel tank 13 may be arranged. The fuel tank 13 may include a hollow tank body 13a. A stiffener portion 36 may be arranged between a bottom portion of the tank body 13a and an upper portion of the head cover 12. The stiffener portion 36 may be an arm-shaped frame reinforcing member which connects a vertically intermediate portion of the down frame 5 and a rear portion of the main frame 3. In the inside of the tank body 13a, an incorporated fuel pump 40 may be housed.

The fuel pump 40 may be also arranged directly above the cylinder 8 so as to overlap with an axially extending line of the cylinder axis C1 which constitutes the center (axis of a piston) of the cylinder 8. Here, the arrangement position of the fuel pump 40 may be slightly shifted in the longitudinal direction provided that at least a portion of the fuel pump 40 overlaps with the cylinder axis C1. Also in this case, the fuel pump 40 may be arranged to fall within a longitudinal width of the cylinder 8 as viewed in a side view. In other words, the fuel pump may be arranged within a space which is defined by extending profile lines of the front and rear portions of the cylinder 8 upwardly. Due to such an arrangement, the fuel pump 40 may have a large weight that can be arranged in the vicinity of the center of gravity W of the engine 7 in the longitudinal direction of the vehicle body. The center of gravity W of the engine 7 may be arranged in the close vicinity of an axis O of the crankshaft 9a and at a rear oblique upward position of the axis O.

Figure 3:
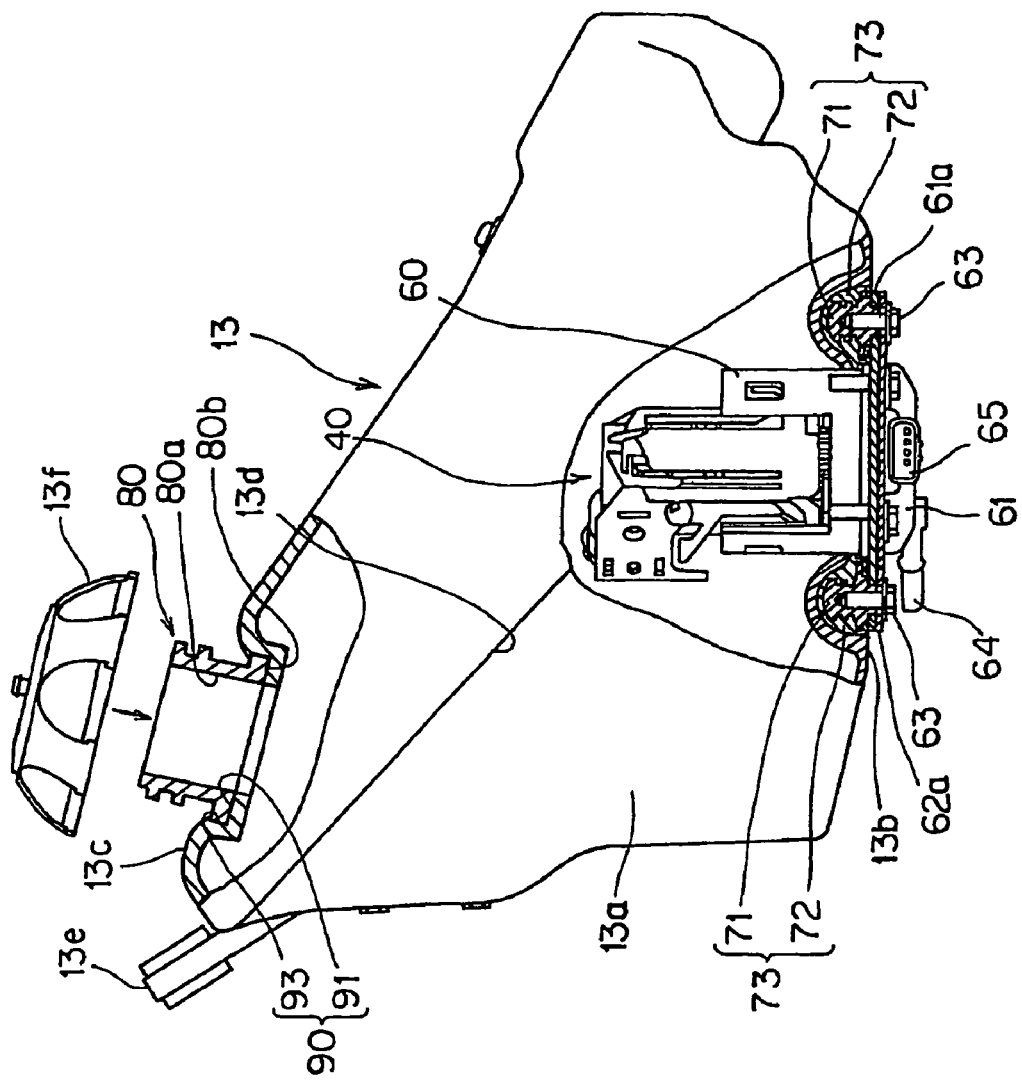
FIG. 3 is a side view of a fuel tank with a part broken away.

The fuel pump 40 may include, as illustrated in FIG. 3, a fuel pump body portion 60, which constitutes an upper portion of the fuel pump 40, and a base portion 61, which constitutes a lower portion of the fuel pump 40. The fuel pump body portion 60 may inserted into the inside of the tank body 13a.

The tank body 13a may include a relatively small size and may be formed using a resin material having fuel permeation resistance. The tank body 13a may also be formed in an approximately right-angled triangular shape having a right-angled portion at a left lower portion thereof in a side view. The tank body 13a may also include an approximately right-angled portion thereof positioned at a front-side lower portion thereof. The tank body 13a may also include an upper surface thereof formed into an inclined surface which is inclined rearward and downward.

On both sides of a front-side portion of the tank body 13a, a stepped portion 13d on which an upper surface of the main frame 3 is placed may be formed. On a front portion of the tank body 13a, a mounting bracket 13e may be mounted. The mounting bracket 13e may include a lower portion thereof fixed to an upper portion of a front surface of a side wall of the tank body 13a by bolts. At the same time, the mounting bracket 13e may include an upper portion thereof fixed by bolts to a gusset 37 (see FIG. 2) which is integrally formed with the head pipe 2 and extends rearward.

Figure 4:
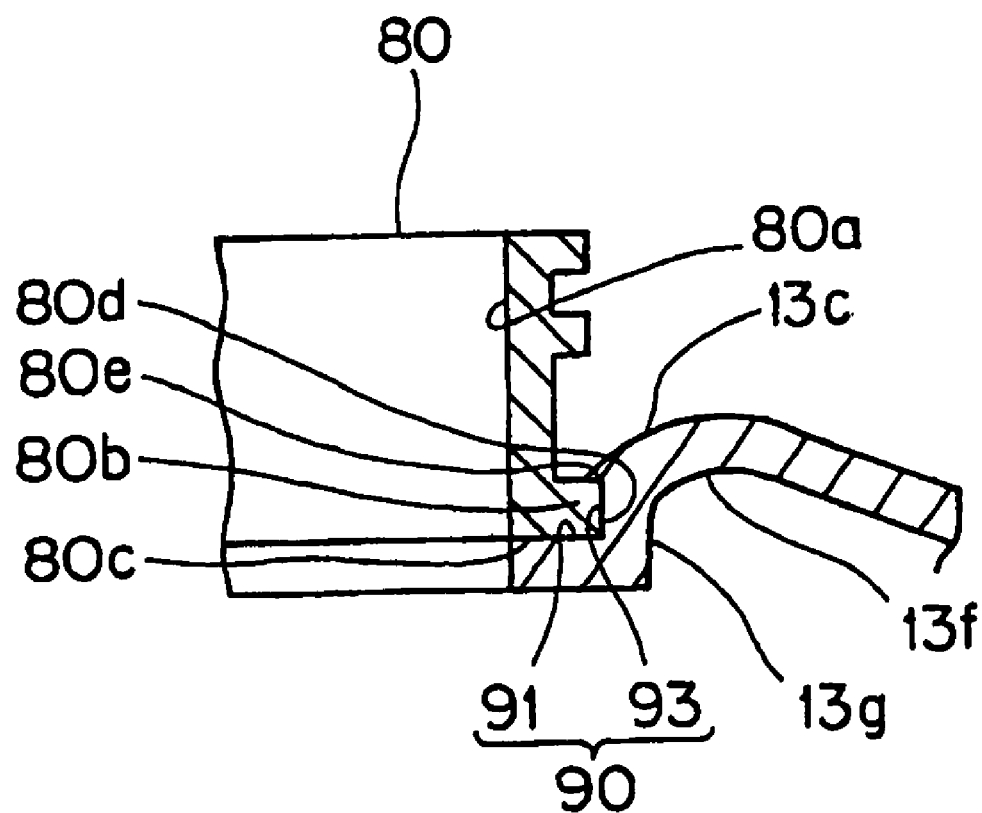
FIG. 4 is an enlarged cross-sectional view of an insert portion.

An insert portion 80 may be formed on an upper portion of the tank body 13a, and a tank cap 13f, which closes an opening 80a for filling fuel, may be mounted on the insert portion 80 in an openable/closable manner. The insert portion 80 may preliminarily be formed as a unitary body by injection molding using a resin material. The insert portion 80 may include a mounting portion 80b to be mounted on the tank body 13a. The mounting portion 80b may be mounted on an outer layer 13c of the tank body 13a by welding. As illustrated in FIG. 4, a recessed portion 90 may be formed on the outer layer 13c of the tank body 13a. The recessed portion 90 may include a bottom portion 91 and an inner peripheral portion 93, a bottom portion mounting surface 80c of the mounting portion 80b may be welded to the bottom portion 91, and an outer peripheral mounting surface 80d of the mounting portion 80b may be welded to the inner peripheral portion 93. Symbol 80e may indicate an end portion of the mounting portion 80b. The outer layer 13c of the tank body 13a may be welded to an end portion of the mounting portion 80b such that the outer layer 13c is brought into close contact with the end portion 80e.

As illustrated in FIG. 3, an insert molded body 73 may integrally be formed on the bottom portion 13b of the tank body 13a by insert molding. The insert molded body 73 may be constituted of an insert ring 71, and a resin material 72, which covers the insert ring 71 such that the resin material 72 wraps the insert ring 71. The insert ring 71 may be made of a metal material, and the resin material 72 may be polyethylene. The resin material 72 may include a molecular weight different from a molecular weight of a resin material (polyethylene), which may be used for forming the tank body 13a. The base portion 61 may include a flange portion 61a which may extend toward a side of the fuel pump 40 in parallel to the bottom portion 13b. In a state that the flange portion 61a is brought into contact with the bottom portion 13b from below, the flange portion 61a may be mounted on the bottom portion 13b of the tank body 13a by threadedly engaging 6 bolts 63 with the insert ring 71 from below by way of a ring-shaped plate 62a. Further, a connector 65, which projects sideward and slightly rearward, may be mounted on the bottom portion 13b, and an electric line 45, which supplies a drive power source to the fuel pump 40, may be connected to the connector 65.

With respect to the base portion 61, a joint pipe 64, which is connected to a discharge port (not shown in the drawing) of the fuel pump body portion 60, may extend frontward. As illustrated in FIG. 2, one end of a fuel supply pipe 41 may be connected to the joint pipe 64, and the other end of the fuel supply pipe 41 may be bent in an approximately U shape and, thereafter, may extend rearward and may be connected to a fuel injection nozzle 42 of the throttle body 18. The fuel injection nozzle 42 may constitute a known electronic fuel injection device. The fuel supply pipe 41 may be a passage which supplies high-pressure fuel from the fuel pump 40 to the fuel injection nozzle 42. The fuel supply pipe 41 may pass between the bottom portion 13b and the head cover 12. The fuel supply pipe 41 may be curved before arriving at a rear portion of the cylinder head 11, thereby enabling relatively short piping. As a result, a pressure loss of fuel can be decreased contributing to the reduction of weight.

The throttle body 18 may be connected to an intake passage 43 which is formed in the cylinder head 11 and extends upward in an oblique upward posture. The fuel injection nozzle 42 may obliquely be inserted into a socket formed in a side surface of the throttle body 18. An injection opening may be formed in a distal end of the fuel injection nozzle 42 to face the inside of an intake passage 43, thereby allowing the injection of fuel into the inside of the intake passage 43. Further, one end of a control electric line 48 may be connected with the fuel injection nozzle 42 via an electric-line connector 44.

One end of a high-tension cord 47, which constitutes an ignition high-voltage electric line, may be connected to an ignition plug 46 mounted on the head cover 12, thereby allowing the application of an ignition high-voltage to the ignition plug 46. Further, the drive electric line 45 for supplying drive electricity may be connected to the fuel pump 40. Other respective ends of these electric lines 45, 47 and 48 may be connected to a capacitor 50 housed in the electronic component casing 35. In the electronic component casing 35, as electronic components, a regulator 51 and an overturn switch 52 may be housed besides the capacitor 50.

The electronic component casing 35 may include a left side surface thereof supported on the center frame 4 at a position behind the cylinder 8 and above the crankcase 9 and, at the same time, at a position close to the cylinder 8. A right side of the electronic component casing 35 may be supported by connecting a stay 53 which extends frontward to a distal end of the engine hanger 34. Further, the long discharge pipe 20 may extend rearward along a side of the electronic component casing 35, and a rear end portion of the muffler 22 opens at a position behind the electronic component casing 35 (see FIG. 1). Accordingly, the electronic component casing 35 can effectively be performed to shield the electronic components from heat or exhaust heat from the cylinder 8.

Next, steps of forming the tank body 13a by resin molding are explained.

Figure 5:
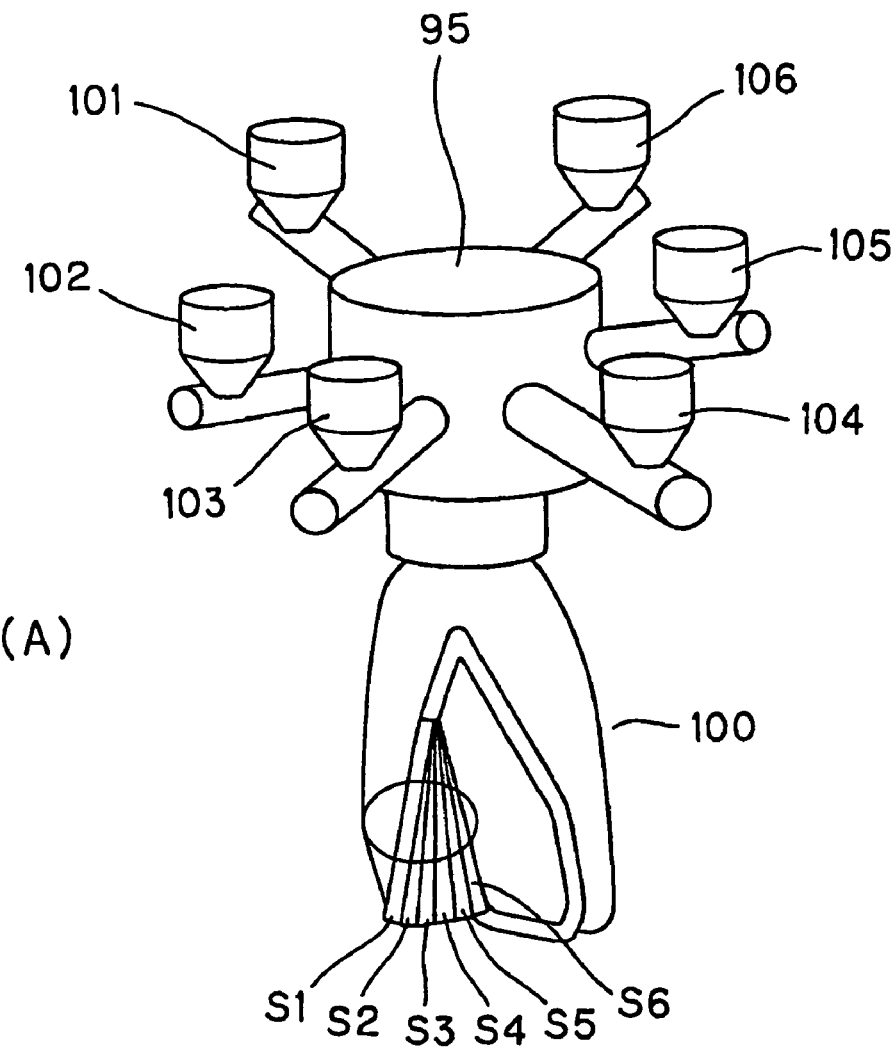
FIG. 5A is a view showing a multi-layered facility injection mechanism.
FIG. 5B is a view showing the cross-sectional structure of the multi-layered facility injection mechanism.
Figure 5:
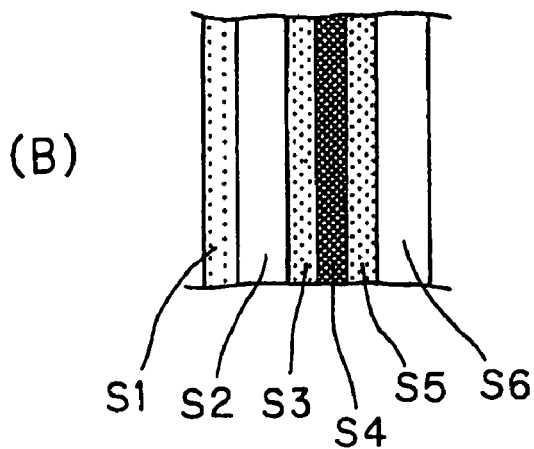

FIGS. 5A and 5B illustrate a view showing a multi-layered facility injection mechanism for forming a resin parison by molding, and FIGS. 6A to 6F illustrate a view showing steps of blow molding. The tank body 13a may be manufactured such that the resin parison, which is constituted of a 4-kind 6-layered (including two adhesive layers), may be formed by multi-layered molding. The parison may be transferred to a mold and may be subject to blow molding so as to manufacture the tank body 13a.

In FIG. 5A, the multi-layered facility injection mechanism may include a body 95 and six filling devices 101 to 106 which are connected to the body 95. The filling device 101 may fill carbon-black-containing HDPE (highly-dense polyethylene) which becomes an outermost layer of the parison 100. The filling device 103 may fill a burr regeneration material (pulverized material) which becomes an inner layer of the carbon-black-containing HDPE. The filling device 104 may fill HDPE (Highly-dense polyethylene) which becomes an innermost layer of the parison. The filling device 106 may fill EVOH (ethylene vinyl alcohol) which becomes an intermediate layer of the parison and suppresses permeation of fuel. The filling devices 102, 105 may fill adhesive agents. The burr regeneration material (pulverized material) may be a waste material, and this waste material layer may include finely pulverizing a yield generated in an outer-layer forming stage. Although the waste material layer may contain EVOH, when a diameter of burrs is large, the outer layer may be liable to be easily broken. Accordingly, with respect to the constitution adopted by one of embodiments of the invention, a total length of an aggregate of EVOH may be controlled to 1000 μm or less.

Filling grooves (not shown in the drawing), which allow the continuous extrusion of the respective resins, may be formed on an inner side of the body 95 and the injection grooves may decide a mixing ratio of respective resins. When the filling devices 101 to 106 are operated and the resins are continuously extruded, the resin parison 100 having the multi-layered structure shown in FIG. 5B may be formed by molding. In FIG. 5B, the outermost layer S1 may be a layer made of carbon-black including HDPE (Highly-dense polyethylene) and including a thickness of 0.25 mm or more. The inner layer S2 may be a layer made of the burr regeneration material (pulverized material) and may include a thickness of 1.0 mm or more. The layer S3 may be a layer made of the adhesive agent and may include a thickness of 45 μm or more. The intermediate layer S4 may be a layer made of EVOH (ethylene vinyl alcohol) and may include a thickness of 70 μm or more. The layer S5 may be a layer made of the adhesive agent and may include a thickness of 45 μm or more. The innermost layer S6 may be a layer made of HDPE (Highly-dense polyethylene) and may include a thickness of 0.9 mm or more.

The tank body 13a may be, as illustrated in FIG. 6A to FIG. 6F, manufactured by transferring the resin parison 100 to molds 108, 109 and by performing blow molding of the resin parison 100.

Figure 6:
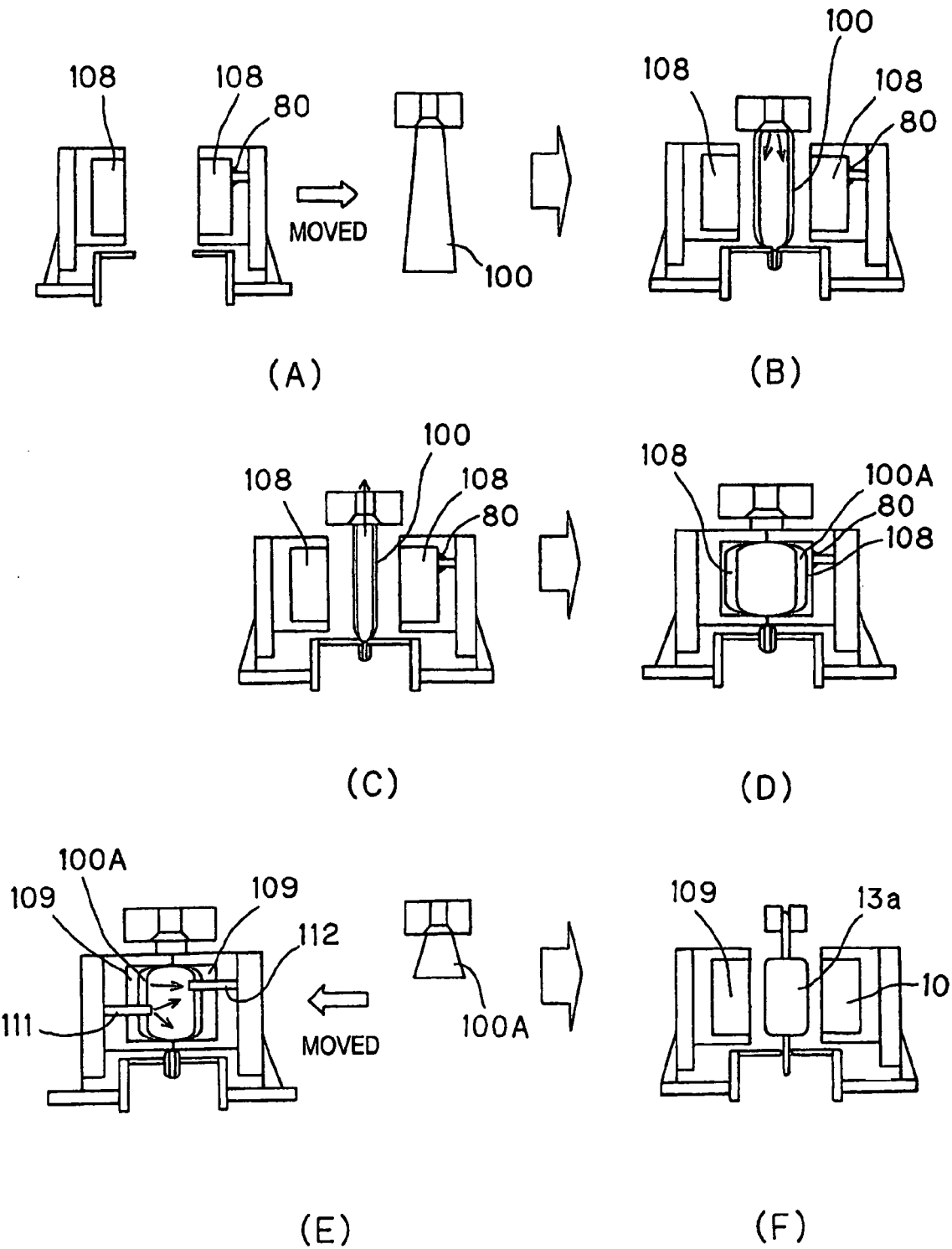
FIG. 6A to FIG. 6F are views showing steps of blow molding.

As illustrated in FIG. 6A, the provisional mold 108 may be formed by preliminarily integrally assembling the insert portion 80, which is welded to an upper portion of the tank body 13a, and an insert molded body (not shown in the drawing), which is formed on the bottom portion 13b of the tank body 13a, by insert molding. The above-mentioned parison 100 may be inserted into the mold 108 (FIG. 6A), pre-blow (FIG. 6B) may be applied to the inside of the parison 100, and a pressure in the provisional mold 108 is reduced (FIG. 6C). As a result, a wall thickness of the parison 100A is determined as shown in FIG. 6D. At this stage of the operation, the insert portion 80 and the insert molded body may be formed into a unitary body. Next, this parison 100A may be formed into a unitary body that may be inserted into the mold 109 (FIG. 6E). In this step, nozzles 111, 112 may be mounted on two portions of the mold 109.

Then, air may be blown through one nozzle 111 while managing a predetermined air temperature and a predetermined blow time. Air may also be discharged through the other nozzle 112 with a delay of time. After performing the blow molding, the tank body 13a, which is formed into a final prototype, may be discharged from the mold 109 (FIG. 6F). The nozzles 111, 112 may be mounted through an opening formed in the insert portion 80 and an opening in the vicinity of the insert molded body 73.

In this embodiment, in the blow molding stage illustrated in FIG. 6E, due to an outwardly bulging force, as illustrated in FIG. 4, the outer layer 13c of the tank body 13a may be formed such that the outer layer 13c bulges outward and upward than the mounting portion 80b. As a result, the outer layer 13c may be brought into close contact with the outer peripheral mounting surface 80d of the mounting portion 80b of the insert portion 80 and the outer layer 13c may overlap with the end portion 80e of the mounting portion 80b. In other words, the mold 109 used in the stage illustrated in FIG. 6E may be designed such that the outer layer 13c is molded in the above-mentioned molded state where the outer layer 13c bulges more outward and upward than the mounting portion 80b. In this case, a bulging inner surface 13f of the tank body 13a at a position where the tank body 13a bulges outside the mounting portion 80b of the insert portion 80 may be positioned more outside than the outer peripheral mounting surface 80d of the mounting portion 80b. Further, a counter inner surface 13g of the tank body 13a may be contiguously with the bulging inner surface 13f of the tank body 13a and facing the outer peripheral mounting surface 80d of the mounting portion 80b may be inclined toward the outside of the tank body 13a while being away from the outer peripheral mounting surface 80d of the mounting portion 80b.

As described above, when the mounting portion 80b of the insert portion 80 is welded to the outer layer 13c of the tank body 13a, in the mounting portion 80b, there exists possibility that the external layer 13c is shrunken after welding, and an extremely small gap, that is, a notch may be formed between the outer peripheral mounting surface 80d of the mounting portion 80b and the outer layer 13c. Particularly, when a large force is applied to a vehicle from the outside, there exists possibility that the tank body 13a is influenced by such a force.

According to the constitution of one of the embodiments of the invention, as illustrated in FIG. 4, the outer layer 13c of the tank body 13a may be brought into close contact with the outer peripheral mounting surface 80d of the mounting portion 80b of the insert portion 80. The outer layer 13c may also be brought into close contact with the end portion 80e of the mounting portion 80b in an overlapping manner. The outer layer 13c may be formed so as to bulge more outward and upward than the mounting portion 80b. Accordingly, in the step of forming the outer layer 13c, the outer peripheral mounting surface 80d and the end portion 80e of the mounting portion 80b of the insert portion 80 and the outer layer 13c may be brought into close contact with each other due to the outwardly bulging force As a result, the formation of a notch at such a portion can be suppressed.

Further, the bulging inner surface 13f of the tank body 13a at the position where the tank body 13a bulges more outside than the mounting portion 80b of the insert portion 80 may be positioned more outside than the outer peripheral mounting surface 80d of the mounting portion 80b. Accordingly, in the step of forming the outer layer 13c, the outer peripheral mounting surface 80d and the end portion 80e of the mounting portion 80b of the insert portion 80 and the outer layer 13c may be brought into close contact with each other due to the outwardly bulging force and hence. As a result, the formation of a notch in such a portion can be suppressed.

Further, the opposing inner surface 13g of the tank body 13a, which is contiguously formed with the bulging inner surface 13f of the tank body 13a and extends while facing the outer peripheral mounting surface 80d of the mounting portion 80b in an opposed manner, may be inclined toward the outside of the tank body 13a and may be away from the outer peripheral mounting surface 80d of the mounting portion 80b. Accordingly, in the step of forming the outer layer 13c, the outer peripheral mounting surface 80d and the end portion 80e of the mounting portion 80b of the insert portion 80 and the outer layer 13c are brought into close contact with each other due to the outward bulging force and hence. As a result, the formation of a notch at such a portion can be suppressed.

Further, by preliminarily forming the above-mentioned insert portion 80 by injection molding, and by preliminarily integrally assembling the insert portion 80 to the provisional mold 108 as illustrated in FIG. 6A, the tank body 13a can be formed by blow molding. Further, since the insert portion 80 can be simultaneously mounted on the tank body 13a at the time of performing the blow molding, a method of manufacturing the fuel tank 13 of a vehicle made of fuel-permeation-resistance resin material can be simplified.

FIG. 7A to FIG. 7D illustrate a mode which can suppress the formation of a notch.

Figure 7:
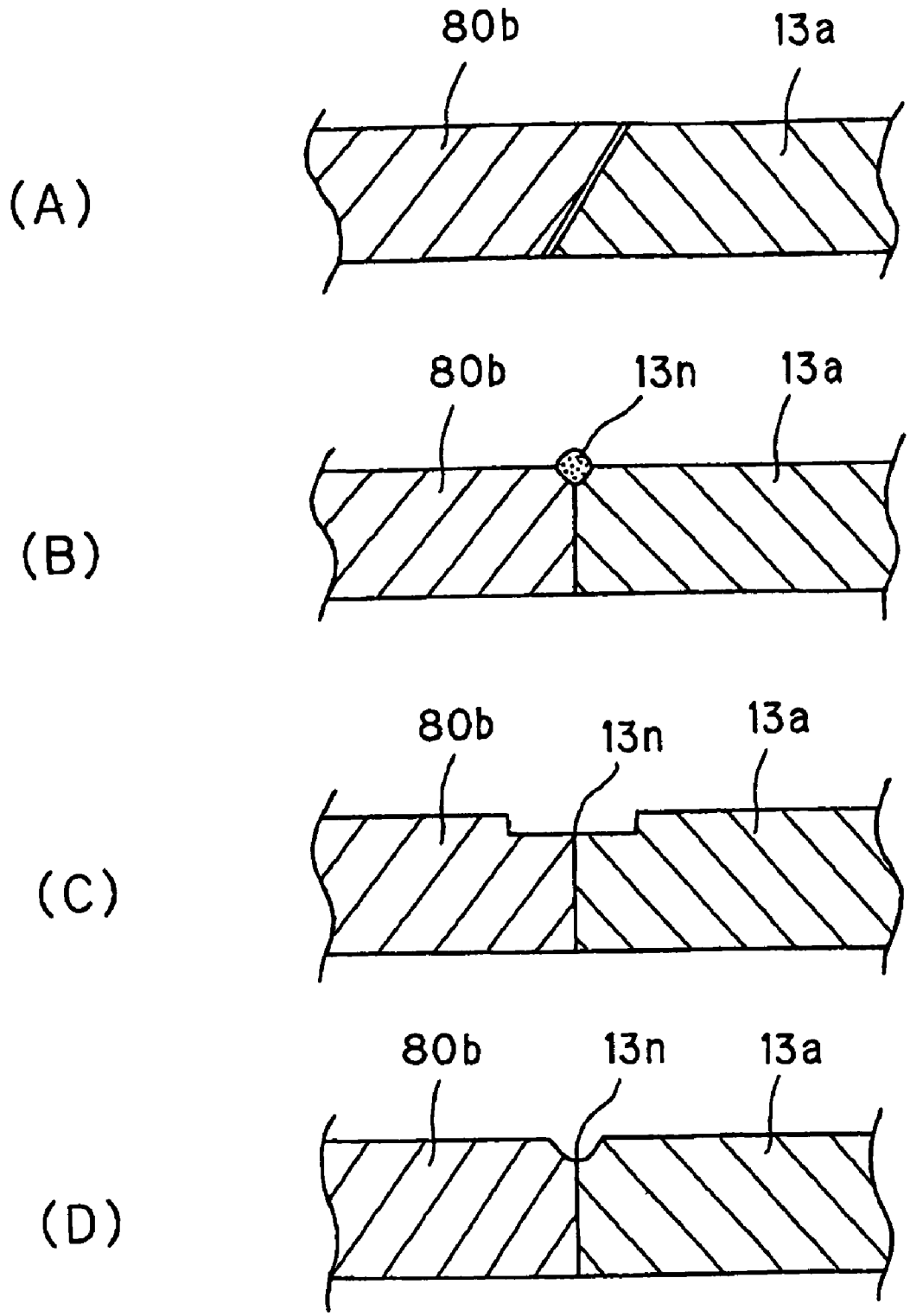
FIG. 7A to FIG. 7D are views showing another embodiment of the invention.

In FIG. 7A, an oblique cut may be formed between the mounting portion 80b and the outer layer 13. The outer layer 13 may be pushed to the mounting portion 80b at the time of shrinking of the outer layer 13. In FIG. 7B, a cut may be vertically formed between the mounting portion 80b and the outer layer 13, and a resin may be filled and embedded in a notch portion 13n. Further, in FIG. 7C, a vertical cut may be formed between the mounting portion 80b and the outer layer 13, and a notch portion 13n may be depressed. Further, in FIG. 7D, a vertical cut may be formed between the mounting portion 80b and the outer layer 13, and a notch portion 13n may be cut by machining.

Although the case in which the tank body 13a is formed by blow molding is exemplified in the above-mentioned embodiment, the embodiment is not limited to such an example, and the tank body 13a may be formed by rotary molding. In this case, the insert molded body 73 and the insert body 80 may be preliminarily mounted on a mold. Thereafter, a resin material served in a powdery state may be filled in the mold and rotary molding may be performed thus forming the tank body 13a by molding and, at the same time, forming the insert molded body 73 and the insert portion 80 in the tank body 13a by insert molding. Here, the rotary molding may be a molding technique in which a thermoplastic powdery resin may be filled in a mold. The mold may be heated to 360° C., for example, in a heating furnace. The resin may be melt while rotating the mold in biaxial directions. Thereafter, the inside of the resin may be cooled and solidified to form a molded product by molding.

According to one embodiment of the invention, a resin-made fuel tank structure of a vehicle is provided. The resin-made fuel tank structure includes a tank body which may be made of a resin material. The resin material may include fuel permeation resistance. The resin-made fuel tank structure include an insert portion, which may be made of a resin material, that may be formed separately from the tank body. The insert portion may include a mounting portion for mounting the insert portion on the tank body and an opening for filling fuel. The insert portion may be mounted on an outer layer of the tank body by welding. The outer layer of the tank body may be formed such that the outer layer can be brought into close contact with an end portion of the mounting portion of the insert portion. The outer layer may bulge outward and upward from the mounting portion.

According to another embodiment of the invention, the outer layer of the tank body may be brought into close contact with the end portion of the mounting portion of the insert portion. The outer layer of the tank body may also, at the same time, be configured to bulge more outward and upward than the mounting portion. Accordingly, when configuring the outer layer, the end portion of the mounting portion of the insert portion and the outer layer may be brought into close contact with each other due to an outwardly bulging force. As a result, the formation of a notch in such a portion can be suppressed.

According to another embodiment of the invention, the outer layer of the tank body may be brought into close contact with an upper portion of the end portion of the mounting portion. As a result, when forming the outer layer, the end portion of the mounting portion of the insert portion and the outer layer may be brought into close contact with each other with no gap between the two by an outwardly bulging force. As a result, the formation of a notch in the portion can be suppressed.

Furthermore, according to another embodiment of the invention, the insert portion may be preliminarily formed by injection molding, the tank body may be formed by blow molding, and the insert portion may be mounted on the tank body simultaneously with the blow molding of the tank body. As a result, the manufacturing of a fuel tank, which may be made of a fuel-permeation-resistant resin material in a vehicle, can be simplified.

According to another embodiment of the invention, the outer layer of the tank body may be configured such that the outer layer can be brought into close contact with the end portion of the mounting portion of the insert portion. At the same time, the outer layer bulges more outward and upward than the mounting portion. Therefore, when configuring the outer layer, the end portion of the mounting portion of the insert portion and the outer layer are brought into close contact with each other due to an outward bulging force. As a result, a formation of a notch in such a portion can be suppressed.

Furthermore, according to another embodiment of the invention, the outer layer of the tank body is brought into close contact with the upper portion of the end portion of the mounting portion and hence, in the step of forming the outer layer, the end portion of the mounting portion of the insert portion and the outer layer are brought into close contact with each other with no gap therebetween due to an outward bulging force thus suppressing the formation of a notch in such a portion.

According to another embodiment of the invention, the insert portion may preliminarily be formed by injection molding, the tank body may be formed by blow molding, and the insert portion may be mounted on the tank body simultaneously with the blow molding. As a result, the manufacturing method of the fuel tank can be simplified.

The above-described embodiments of the invention are not the only form of the resin made fuel tank structure of the vehicle according to some of the embodiments described above. In addition, various other configurations can be employed for the resin made fuel tank structure of the vehicle without departing from the spirit and scope of some of the embodiments of the invention.

The metes and bounds of the some of the embodiments of the invention are defined only by the appended claims.

EXPLANATION OF REFERENCE NUMERALS AND LETTERS

1: vehicle body frame
7: engine
13: fuel tank
13a: tank body
13c: outer layer
13f: tank cap
80: insert portion
80a: opening
80b: mounting portion
80c: bottom portion mounting surface
80d: outer peripheral mounting surface
80e: end portion
90: recessed portion

We claim:

1. A fuel tank structure of a vehicle, comprising:
a tank body including a resin material having fuel permeation resistance; and
an insert portion separate from the tank body, said insert portion comprising a resin material and including a mounting portion to mount the insert portion on the tank body and a fuel fill opening, wherein the insert portion is configured to be mounted to an outer layer of the tank body,
wherein the outer layer comprises a bulging portion surrounding an end portion of the mounting portion of the insert portion and bulging more outwardly and upwardly than the mounting portion, and
wherein the bulging portion of the outer layer applies an outwardly bulging force that forms close contact between the outer layer and the end portion of the mounting portion of the insert portion.

2. The fuel tank structure of a vehicle according to claim 1, wherein the outer layer of the tank body is configured to be in close contact with an upper portion of the end portion of the mounting portion.

3. The fuel tank structure of a vehicle according to claim 1, wherein the insert portion comprises an injection-molded resin material,
wherein the tank body comprises a blow-molded material, and
wherein the insert portion is configured to be mounted on the tank body.

4. A fuel tank structure of a vehicle, comprising:
tank body means for providing a tank body comprising of a resin material having fuel permeation resistance;
insert portion means for providing an insert portion separate from the tank body, said insert portion comprising a resin material and including a mounting portion and an fill fuel opening;
mounting portion means for mounting a mounting portion of the insert portion on the tank body; and
outer layer means for welding the insert portion to an outer layer of the tank body,
wherein the outer layer comprises a bulging portion surrounding an end portion of the mounting portion of the insert portion and bulging more outwardly and upwardly than the mounting portion, and
wherein the bulging portion of the outer layer applies an outwardly bulging force that forms close contact between the outer layer and the end portion of the mounting portion of the insert portion.

5. The fuel tank structure according to claim 4, further comprising:
upper portion means for configuring the outer layer of the tank body to be in close contact with an upper portion of the end portion of the mounting portion.

6. The fuel tank structure according to claim 4, further comprising:
   injection molding means for forming the insert portion by injection molding,
   blow molding means for forming the tank body by blow molding, and
   mounting means for mounting the insert portion on the tank body simultaneously with the blow molding of the tank body.

* * * * *